United States Patent [19]

Song

[11] Patent Number: 5,369,568
[45] Date of Patent: Nov. 29, 1994

[54] POSITION CONTROLLING METHOD OF ROBOT

[75] Inventor: Jin-Il Song, Inchun, Rep. of Korea

[73] Assignee: Samsung Electronics Co., Ltd., Suwon, Rep. of Korea

[21] Appl. No.: 779,999

[22] Filed: Oct. 21, 1991

[30] Foreign Application Priority Data

Oct. 26, 1990 [KR] Rep. of Korea ............... 90-17260

[51] Int. Cl.$^5$ ............................................. G05B 19/04
[52] U.S. Cl. ........................... 364/167.01; 364/162; 901/9; 318/568.11; 318/568.15
[58] Field of Search ............... 364/162, 167.01, 474.35; 901/9, 14, 15, 16; 318/632, 603, 636, 568.11, 568.13, 568.15, 627, 570

[56] References Cited

U.S. PATENT DOCUMENTS

| | | | |
|---|---|---|---|
| 4,466,054 | 8/1984 | Shigemasa et al. | 318/636 |
| 4,541,062 | 9/1985 | Kada et al. | 364/193 X |
| 4,578,749 | 3/1986 | Kuno et al. | 901/9 X |
| 4,587,618 | 5/1986 | Oguchi | 364/167.01 X |
| 4,625,285 | 11/1986 | Mori et al. | 364/513 |
| 4,902,950 | 2/1990 | Kawamura et al. | 318/626 X |
| 5,034,877 | 7/1991 | Shultz | 364/167.01 |
| 5,083,072 | 1/1992 | Song | 364/174 X |

Primary Examiner—Tan V. Mai
Assistant Examiner—Brian C. Oakes
Attorney, Agent, or Firm—Burns, Doane, Swecker & Mathis

[57] ABSTRACT

This invention relates to a position controlling method for a robot in which a residual vibration is suppressed during the position controlling of a horizontal multiple articulation robot or an orthogonal robot. High speed position control is possible. A sampling time is reduced by executing acceleration and deceleration with a discrete time state equation. Highly precise control for a robot is obtained by a method which determines the maximum movement amount from the movement amount of each axis at an input pulse number computing step. The method also seeks the number of input pulses moved at every sampling time in the case of no acceleration and deceleration. The method further seeks the input pulse of the axis except the axis of maximum movement amount from the number of input pulses. The aiming position of each axis at every sampling time is computed using the discrete time state equation. The present position of each axis is detected. Proportional integral and differential PID controls are executed, and outputs are provided as a driving signal to a servomotor.

7 Claims, 5 Drawing Sheets

POSITION CONTROLLING METHOD OF ROBOT

BACKGROUND OF THE INVENTION

1. Technical Field

The present invention relates to a position controlling method for a robot, and more particularly, to a position controlling method for a robot in which position control of a horizontal multiple articulation robot or an orthogonal robot is executed at high speed while preventing a residual vibration and preventing unwanted acceleration and deceleration of the robot. These objectives are realized by a discrete time state equation which utilizes a decreased sampling time such that highly precise position control can be executed.

2. Prior Art

Heretofore, various methods have been applied for a position control of a horizontal multiple articulation robot or an orthogonal robot.

Figure 1:
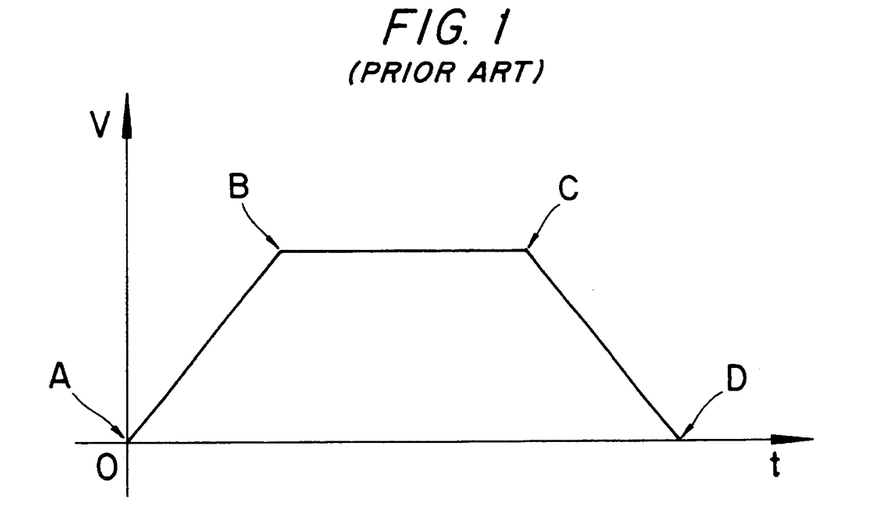
FIG. 1 is a graph illustrating a linear accelerating-/decelerating system in a position controlling method for a conventional robot.

Namely, there is a known linear accelerating or decelerating method as shown in FIG. 1. Since this method uses the relation of speed (v) versus time (t), there is discontinuity at points A, B, C, D such that a moving direction of the robot is changed when the robot moves in a trapezoidal waveform around the 0-axis. This method disadvantageously generates a vibration so that the time to decide a movement position of the robot becomes substantially longer.

Figure 2:
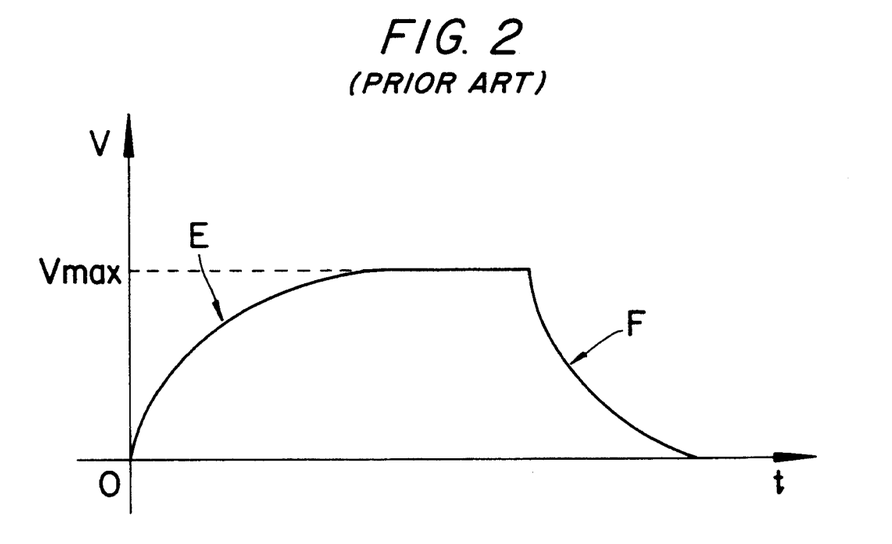
FIG. 2 is a graph illustrating an exponential functional accelerating/decelerating system in a position controlling method for a conventional robot.

According to the exponential functional accelerating and decelerating method as shown in FIG. 2, a speed (V(t)) upon acceleration (E) is $V(t) = V_{max} \{1 - \exp(t/\tau)\}$ ($\tau$:time constant of the exponential function), a speed (V(Ts)) of a motor at every sampling time (Ts) becomes: $V(Ts) = V_{max} \{1 - \exp(Ts/\tau)\}$, a position (P(Ts)) of the robot at this moment becomes: $P(Ts) = V(Ts) \times Ts = V_{max} \{1 - \exp(Ts/\tau)\} \times Ts \ldots (1)$ and speed (V(t)) of the motor upon deceleration (F) becomes $V(t) = V_{max} \times \exp(-t/\tau)$, a speed (V(Ts)) of the motor at every sampling time becomes: $V(Ts) = V_{max} \times \exp(-Ts/\tau)$, and the P(Ts) at this moment becomes: $P(Ts) = V(Ts) \times Ts = V_{max} \times \exp(-Ts/\tau) \ldots (2)$. Accordingly, a microprocessor can discriminate either the acceleration or deceleration at every sampling time and compute values at every axis by utilizing the aforesaid expressions (1) or (2). Consequently, there have been problems with the sampling time becoming longer, the preciseness of the position path decreasing and the position control system becoming unstable.

Figure 3:
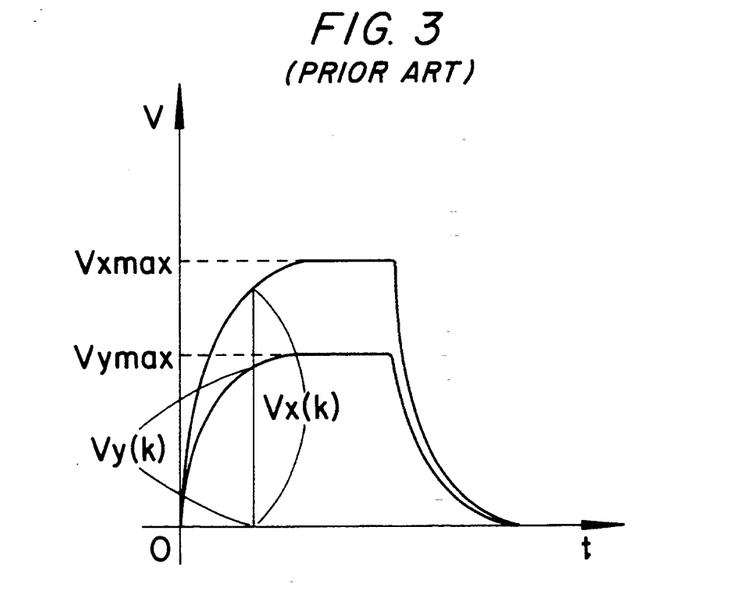
FIG. 3 is a diagram of the speed distribution for plural axes of a conventional robot.

Moreover, when there are a plurality of axes (four axes) in the case of a horizontal multiple articulation robot, it is desirable that each axis start simultaneously and terminate at the same time a driving motion is made. In order to prevent a vibration of the robot body generated by an interfering motion at the axis, a speed distribution should be determined by utilizing an amount of movement (Vx(k), Vy(k)) of each axis as shown in FIG. 3, but there have been considerable difficulties accompanying a determination of speed distribution.

U.S. Pat. No. 4,625,285 is a typical example of a conventional robot controller. The patent discloses movement order generating means for instructing a plurality of the movement aiming positions in response to an operating instruction, aiming position variables forming means for compensating a deviation of a plurality of movement aiming positions previously instructed by said movement instruction generating means, a compacting/expanding means for said movement instructing position variable means, aiming position instructing means having a positional instruction adding section for adding an output signal of said plurality of position controlling means so as to output a plurality of instructions compacted or expanded by said compacting/expanding means so as to execute a position control and a speed control upon said movement, and a driving section for outputting a signal for driving the robot according to the aiming position instructions output by said aiming position instructing means, to thereby execute a plurality of the compacting/expanding position processes combined to the output so as to generate a single instruction.

However, since the robot controller includes a very complicated construction as well as complicated controlling processes, not only does it have an increased manufacturing cost, but it also has an aiming position which may be adversely affected. The aiming position is affected because of the addition to the output of each position controlling means. There is also a problem because repair is very difficult when any malfunction of the device occurs.

OBJECT AND SUMMARY OF THE INVENTION

Therefore, the present invention is made in consideration of the above-described problems. It is an object of the present invention to provide a position controlling method for a robot in which positions upon acceleration and deceleration utilize an exponential function, but the positions are not computed at every sampling time of a microprocessor. The exponential function acceleration and deceleration are realized instead by a discrete time state equation. The sampling time is decreased. The preciseness of a position path is improved, and the position control can be executed at high speed.

Another object of the present invention is to provide a position controlling method for a robot in which each axis of the robot is made to start simultaneously and to reach an aiming position simultaneously so that the generation of vibrations by interference of movement at the axis can be prevented.

In order to attain the above-described objects, the position controlling method for a robot according to the present invention is comprised of an input pulse number computing step which determines the maximum amount of movement by utilizing the amount of movement at each axis, and obtains a number for the input pulse from the pulse number moved at every sampling time when there is no acceleration and deceleration; an input pulse number computing step of an axis for obtaining the input pulse number of an axis except for an axis having the maximum amount of movement from said number of input pulses; a proportional integral and differential controlling step which computes the aiming position of each axis at every sampling time by a discrete time state equation and detects the present position of each axis and computes a deviation of the position and executes a proportional integral and differential (PID) control; and a driving signal outputting step for a servomotor for outputting said proportioned integrated and differentiated control signal into a driving signal for the servomotor; and which is characterized in that the sampling time is decreased, the preciseness of the position path is improved, high speed position control is possible, and also it enables each axis to start simultaneously and reach simultaneously the aiming position.

DETAILED DESCRIPTION OF THE PREFERRED EMBODIMENT

Hereinafter, a preferred embodiment of the present invention will be described in detail with reference to the accompanying drawings.

Figure 4:
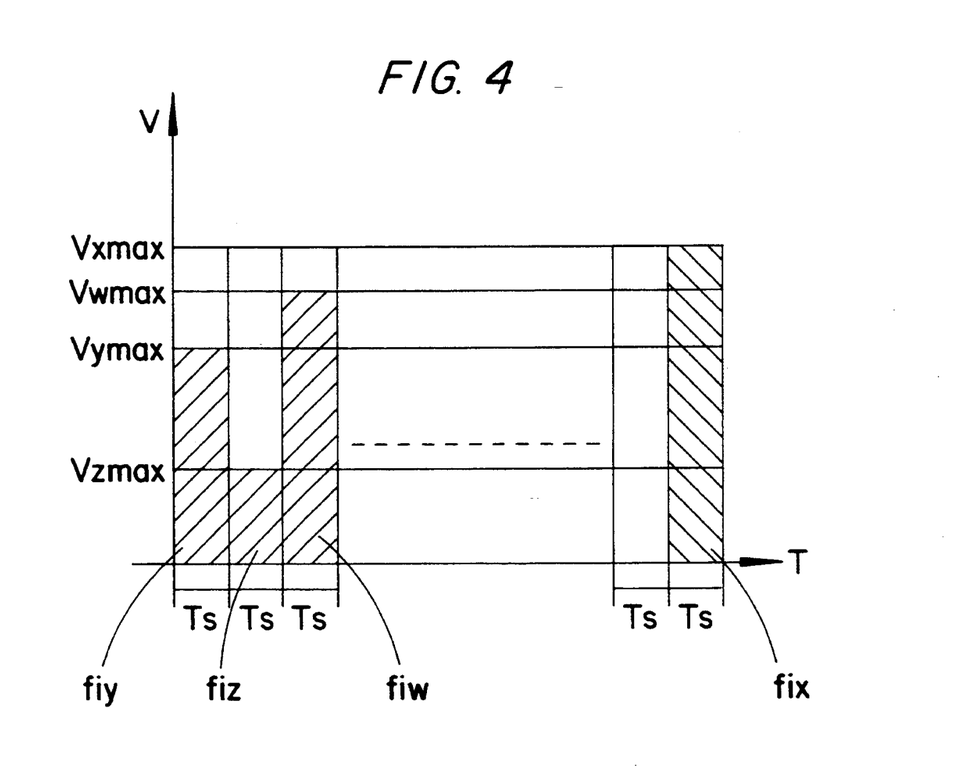
FIG. 4 is a waveform chart illustrating a pulse number that each axis of the robot should move at every sampling time.

In FIG. 4, the slanted line portion shows the pulse number that each axis x, y, z, and w of the robot should move at every sampling time Ts, and Vxmax, Vymax, Vzmax, Vwmax are the maximum speeds of the motor attached to each axis. That is, the pulse number that each axis of the robot should move at every sampling time when there is no acceleration can be computed by utilizing the maximum speed of the motor and the pulse number to be moved at every sampling time Ts of each axis.

Figure 5:
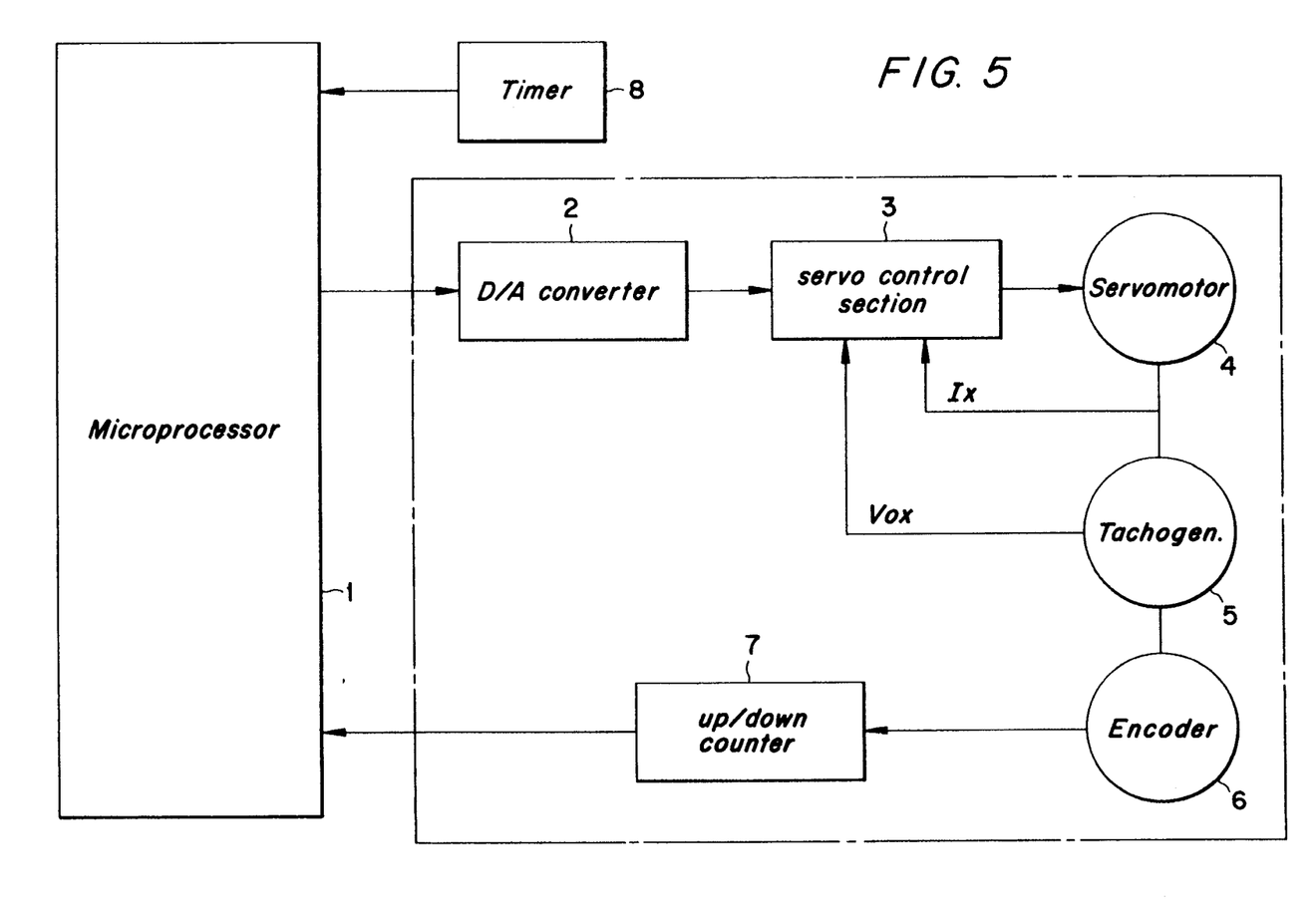
FIG. 5 is a diagram of a position controlling system used to practice the position controlling method for a robot of the present invention.

FIG. 5 is a block diagram showing the position controlling system used in the present invention for only one axis. In FIG. 5, reference numeral 1 is a microprocessor for outputting a speed command for the robot, and reference numeral 2 is a digital/analog converter for converting the speed command output from said microprocessor 1 into analog data, and said converted analog data is input to a servo driver not shown which outputs a command signal for driving a servomotor 4 in a normal direction and a reverse direction as well as a signal for driving speed.

Reference numeral 3 is a servo control section for servo controlling the servomotor 4 by utilizing a current feedback signal Ix and speed feedback signal Vox. The current feedback signal Ix of the servomotor 4 is fed back. A speed feedback signal Vox is fed back from a tacho-generator 5 which detects the driving speed of the servomotor 4. Reference numeral 7 is an up/down counter which up counts or down counts the pulse signal from an encoder 6 outputting the pulse signal in response to the rotating member of said servomotor 4. The up/down counter provides inputs to the microprocessor 1 which judges the present position of the robot. Reference numeral 8 is a timer for interrupting the microprocessor 1 with a predetermined time interval so as to judge correctly the present position of the robot.

In accordance with the position controlling method for a robot according to the present invention, when the timer 8 applies an interrupt to the microprocessor 1 within a predetermined time interval, the microprocessor 1 computes an incremental position amount for each axis of the robot in accordance with the exponential function acceleration and deceleration for every time the interrupt is applied by the timer 8. The microprocessor 1 obtains the aiming position, and judges the present position of the robot on the basis of a value input from the up/down counter 7 to the microprocessor. The pulse signal from the encoder 6 is counted. The microprocessor 1 obtains a difference (the remaining distance) between the present position and final aiming position and then multiplies the position loop gain and inputs the result to the digital/analog converter 2.

The digital data input to the digital/analog converter 2 is converted to an analog data input to the servo control section 3. The servo control section 3 outputs a command signal for driving the servomotor 4 in a normal direction or a reverse direction and the driving speed signal. The speed feedback signal Vox from the tacho-generator 5 together with the current feedback signal Ix of said servomotor 4 are fed back and input to the servo control section 3, so that the servomotor 4 is automatically controlled.

Next, FIG. 6 will be explained.

Figure 6A:
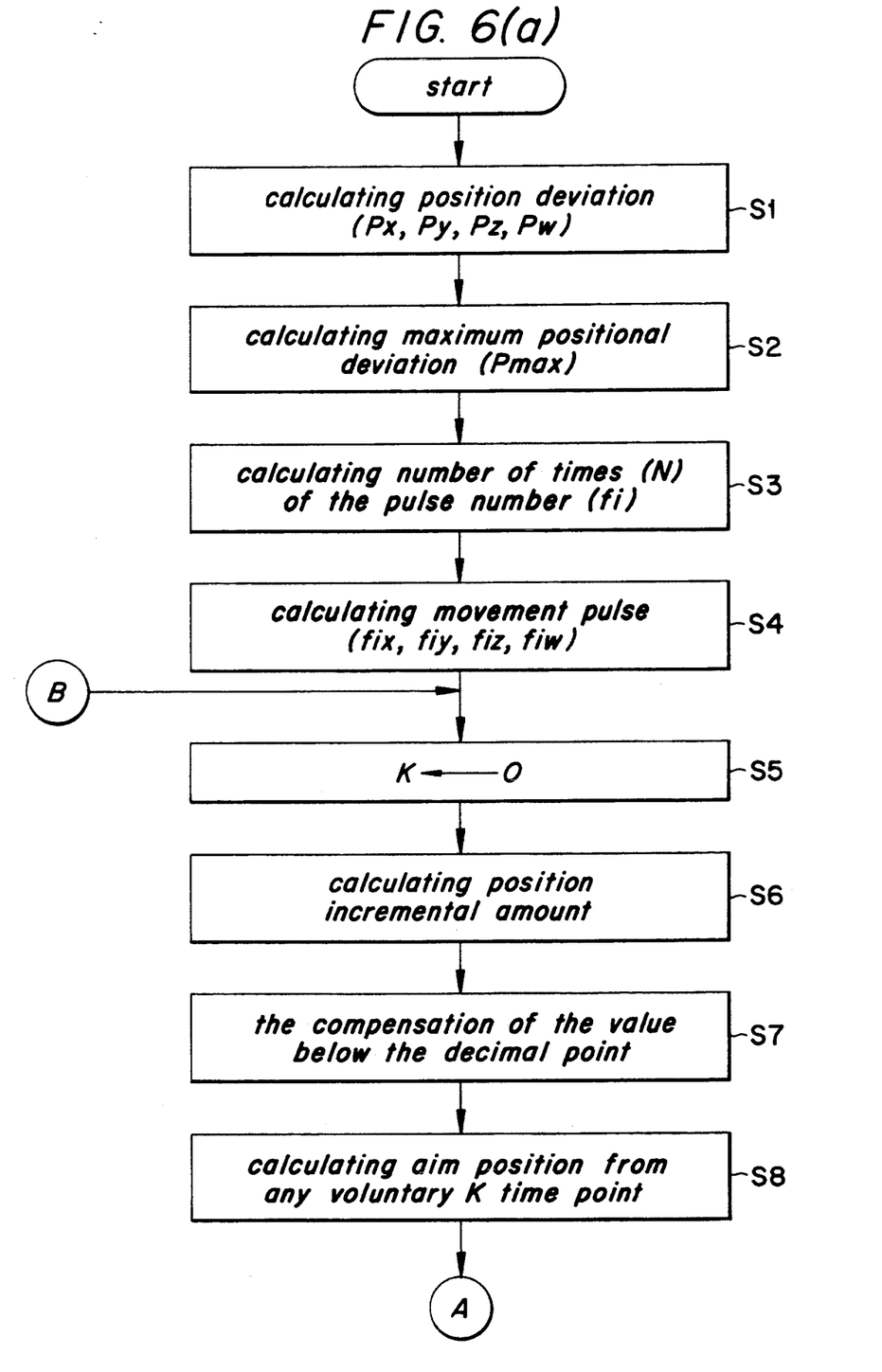
FIGS. 6A and 6B show a flow chart illustrating an operating sequence of the position controlling method for a robot of the present invention.
Figure 6B:
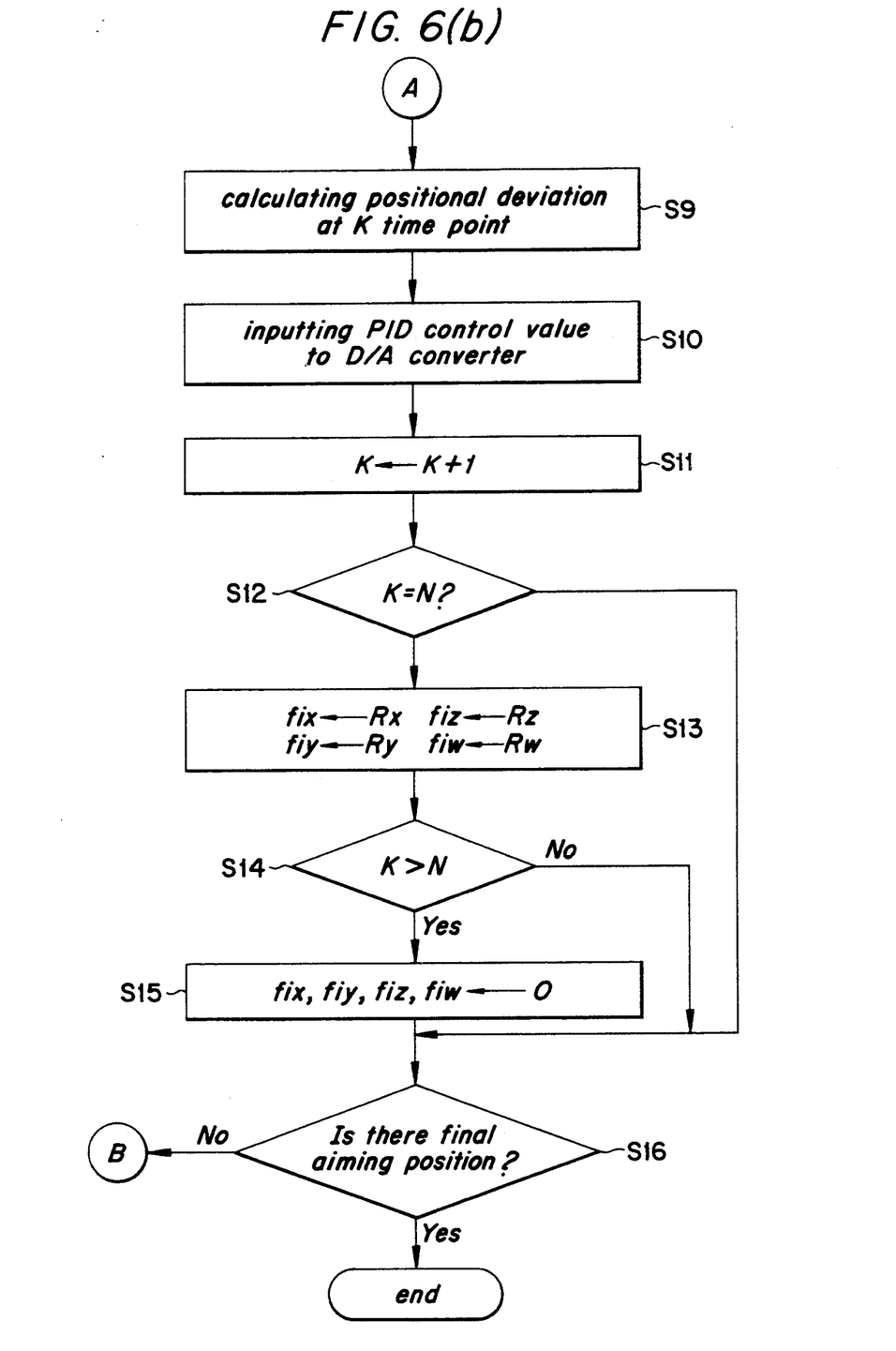

FIG. 6 is a flow chart illustrating the operating sequence of the position controlling method for a robot of the present invention, wherein reference symbol S in FIG. 6 means a step.

Since the present invention includes controlling the position of a robot, when the present invention is first operated, step S1 seeks a positional deviation Px, Py, Pz, Pw of each axis. Since the position deviation is a value deduced from the present positional value while the robot is driving from the final aiming position of the robot, the positional deviations of the four axes x, y, z, and w are defined as Px for X axis, Py for y axis, Pz for z axis, and Pw for w axis, and the positional deviation Px, Py, Pz, Pw for each axis is sought.

Subsequently, advancing to step S2, the maximum positional deviation Pmax is sought, wherein the maximum positional deviation Pmax is sought by the equation $$Pmax = MAX \{Px, Py, Pz, Pw\} \qquad (3)$$

According to this equation, a computation of the pulse number fi to be moved at every sampling time in case of no acceleration is possible. For instance, assume that the maximum speed Vmax of the motor is 3,000 rpm, the pulse number P of encoder 6 is 1,000 pulses/revolution, the interrupt cycle by the timer 8, i.e., sampling time Ts is 1 msec, then the pulse number fi to be moved at every sampling time in the case of no acceleration is:

$$fi = \frac{Vmax}{T} \times P \times Ts \text{ [pulse]} \qquad (4)$$

(wherein T is the time), in accordance with the formula, $$\begin{aligned} fi &= 3000 \text{ rpm}/60 \text{ sec} \times 1000 \text{ pulses} \times 1 \text{ msec} \\ &= 3000 \text{ rpm}/60 \text{ sec} \times 1000 \text{ pulses} \times 1 \times 10 \text{ sec} \\ &= 50 \text{ pulses.} \end{aligned}$$

The pulse number P of the encoder 6 and the sampling time Ts are fixed values. If the pulse number fi value to be moved at every sampling time in the case of no acceleration is to be changed, it is possible only when the maximum speed Vmax of the motor 4 is changed. It is also possible to change the sampling time Ts and the pulse number P of the encoder 6.

The pulse number fi to be moved at every sampling time in the case of no acceleration is obtained, at step S3. The number of times N of the pulse number fi to be moved at every sampling time in the case of no acceleration is sought, and this number of times N is obtained by dividing the maximum positional deviation value Pmax obtained at said step S2 by the pulse number fi to be moved at every sampling time in the case of no acceleration. Namely, it is obtained by the number of times $$N = \frac{Pmax}{fi}. \quad (5)$$

Subsequently, at step S4 the movement pulse fix, fiy, fiz, fiw of each axis at every sampling time in the case of no acceleration and deceleration is sought. If it is assumed that the maximum positional deviation Pmax obtained at said step S2 and the positional deviation Px of x axis are identical (Pmax=Px), the movement pulse at every sampling time in the case of no acceleration and deceleration for each axis becomes fix=fi, for the x axis, fiy=Py/N for the y axis, fiz=Pz/N for the z axis, and fiw=Pw/N for the w axis. For example, in the case where Px=4321 pulses, Py=3214 pulses, Pz=2413 pulses, and Pw=1234 pulses the number of times N of the movement pulse fi at every sampling time in the case of no acceleration becomes:

$$N=4321/50=86+21=Qx+Rx \text{ and } N=86.$$

Accordingly, it becomes:

$$fiy = \frac{Py}{N} = \frac{3214}{86} = 37 + 32 = Qy + Ry$$

$$fiz = \frac{Pz}{N} = \frac{2413}{86} = 29 + 19 = Qz + Rz$$

$$fiw = \frac{Pw}{N} = \frac{1234}{86} = 14 + 10 = Qw + Rw$$

(wherein Qx, Qy, Qz, and Qw are integer values of N, and Rx, Ry, Rz, Rw are remainders.)

That is, in the case of no acceleration up to 86th time, each pulse number fix, fiy fiz, fiw for each x, y, z, w axis movement at every sampling time is respectively fix=86, fiy=37, fiz=29, fiw=14, and at the 87th time it is respectively fix=21 fiy=32, fiz=19, fiw=29, and the pulse number fix, fiy, fiz, fiw for each x, y, z, w axis movement from the 88th is zero.

According to this, at step S6 the position incremental amount of each axis is obtained by the following expression:

Namely,
the position incremental amount of x axis $$fox(k+1)=fox(k)+[fix(k+1)-fox(k)]/A$$

the position incremental amount of y axis $$foy(k+1)=foy(k)+[fiy(k+1)-foy(k)]/A$$

the position incremental amount of z axis $$foz(k+1)=foz(k)+[fiz(k+1)-foz(k)]/A$$

the position incremental amount of w axis $$fow(k+1)=fow(k)+[fiw(k+1)-fow(k)]/A \quad (6)$$

if zero is substituted into the k value of the formula seeking the position incremental amount of each axis at step S5 is $$fox)(0)=foy(0)=foz(0)=fow(0)=0$$

When the position incremental amount of each axis is sought at step S6, the speed curve of exponential functional acceleration and deceleration are as shown in FIG. 3.

On the other hand, the constant A required for obtaining the position incremental amount of each axis is a constant for adjusting the time constant of the exponential speed curve. When the value of the constant A is excessively large, the time constant becomes larger. When the constant A is too small, the time constant becomes smaller, and the accelerating and decelerating time becomes shorter. Therefore, in order to appropriately adjust the accelerating and decelerating time, the value of the constant A is selected in accordance with the characteristics of the mechanical system attached to the servomotor M.

The remainder value obtained as a result of the position incremental amount for each axis is compensated at step S7 so as to compute the correct position path of the robot, and the compensation of the remainder value at said step S7 is processed as follows. That is, at any voluntary k time point along the driving path of the robot, remaining accumulation value $\left( \sum_{i=0}^{k} R(i) \right)$ of $[fi(k + 1) - fo(k)]/A$ is larger than zero, i.e., when $[\{fi(k + 1) - fo(k)\}/A] > 0$ and $$\sum_{i=0}^{k} R[\{fi(i + 1) - fo(k)\}/A] > A,$$

$$fo(k) \leftarrow fo(k) + 1$$

$$\sum_{i=0}^{k} R \leftarrow \sum_{i=0}^{k} R - A, \text{ or else}$$

$$fo(k) \leftarrow fo(k)$$

$$\sum_{i=0}^{k} R \leftarrow \sum_{i=0}^{k} R, \text{ and}$$

Conversely, when $\sum_{i=0}^{k}$ is less than zero at any voluntary $k$ time point, i.e., when $$[\{fi(k + 1) - fo(k)\}/A] < 0 \text{ and}$$

$$\sum_{i=0}^{k} R[\{fi(i + 1) - fo(k)\}/A] < A,$$

$$fo(k) \leftarrow fo(k) - 1$$

$$\sum_{i=0}^{k} R \leftarrow A - \sum_{i=0}^{k} R, \text{ or else}$$

$$fo(k) \leftarrow fo(k)$$

$$\sum_{i=0}^{k} R \leftarrow A - \sum_{i=0}^{k} R.$$

After the compensation is executed for the remainder value for each axis by the above-described method, at step S8 the robot driving aim position from any voluntary k time point for each axis at every sampling time is obtained by utilizing the position incremental amount of each axis x, y, z, w at every sampling time obtained at step S6.

The aiming position Px(k), Py(k), Pz(k), Pw(k), Pw(k) at the k time point for each axis is obtained by $$Px(k) = \sum_{i=0}^{k} fox(i) \quad (7)$$

$$Py(k) = \sum_{i=0}^{k} foy(i)$$

$$Pz(k) = \sum_{i=0}^{k} foz(i)$$

$$Pw(k) = \sum_{i=0}^{k} fow(i).$$

Since the aiming position at the k time point for each axis at every sampling time is obtained at step S8, in order to obtain the positional deviation (aiming position—present position) at the k time point, advancing to step S9, the positional deviation is obtained by the equations:

the positional deviation for the x axis = Px(k) − Cx(k)

the positional deviation for the y axis = Py(k) − Cy(k)

the positional deviation for the z axis = Pz(k) − Cz(k)

the positional deviation for the w axis = Pw(k) − Cw(k)   (8)

wherein, Cx(k), Cy(k), Cz(k) and Cw(k) represent the present position values of the robot which have the value input from the up/down counter 7 to the microprocessor 1 at each axis at any voluntary k time point.

At step S9, the positional deviation of each axis at the k time point is obtained. Advancing to step S10, the proportional integral and differential control is executed in order to obtain the positional deviation of each axis at k time point of step S9. They are computed as follows:

$$Dxout^{(k)} = K_{Px}(Px(k) - Cx(k)) +$$

$$K_{Ix}\left(\sum_{i=0}^{k} Px(i) - \sum_{i=0}^{k} Cx(i)\right) +$$

$$K_{Dx}\left(\frac{Px(k) - Cx(k-1)}{T} \quad \frac{Cx(k) - Cx(k-1)}{T}\right)$$

$$Dyout^{(k)} = K_{Py}(Py(k) - Cy(k)) +$$

$$K_{Iy}\left(\sum_{i=0}^{k} Py(i) - \sum_{i=0}^{k} Cy(i)\right) +$$

$$K_{Dy}\left(\frac{Py(k) - Cy(k-1)}{T} \quad \frac{Cy(k) - Cy(k-1)}{T}\right)$$

$$Dzout^{(k)} = K_{Pz}(Pz(k) - Cz(k)) +$$

$$K_{Iz}\left(\sum_{i=0}^{k} Pz(i) - \sum_{i=0}^{k} Cz(i)\right) +$$

$$K_{Dz}\left(\frac{Pz(k) - Cz(k-1)}{T} \quad \frac{Cz(k) - Cz(k-1)}{T}\right)$$

$$Dwout^{(k)} = K_{Pw}(Pw(k) - Cw(k)) +$$

$$K_{Iw}\left(\sum_{i=0}^{k} Pw(i) - \sum_{i=0}^{k} Cw(i)\right) +$$

$$K_{Dw}\left(\frac{Pw(k) - Cw(k-1)}{T} \quad \frac{Cw(k) - Cw(k-1)}{T}\right)$$

Wherein Dxout, Dyout, Dzout, Dwout are the values input to the digital/analog converter 2 of each axis, $K_{Px}$, $K_{Py}$, $K_{Pz}$, $K_{Pw}$ are the proportional P gains of each axis, and $K_{Ix}$, $K_{Iy}$, $K_{Iz}$, $K_{Iw}$ are integral I gains of each axis. $K_{Dx}$, $K_{Dy}$, $K_{Dz}$, $K_{Dw}$ are the differential D gains of each axis, and the proportional integral and differential PID gain is determined such that the movement of the robot is optimized.

Therefore, the above-described proportioned integrated and differentiated values Dxout(k), Dyout(k), Dzout(k), Dwout(k) are output to the digital/analog converter 2. The value is converted into an analog value by the digital/analog converter 2, the value is input to the servo control section 3, and the motor 4 is driven in accordance with the correctly computed driving control value.

Subsequently, at step S11 the k+1 value is substituted for k of equation (7) in order to obtain the aiming position of the robot at the k+1 time point. Advancing to step S12, the microprocessor 1 judges whether the value of k is identical to the number of times N of the movement pulse fi at every sampling time. At step S13 the remainder values Rx, Ry, Rz, Rw of each axis are obtained by seeking the number of times N of the movement pulse fi at every sampling time. In the case of no acceleration movement, pulses fix, fiy, fiz, fiw are substituted at each axis. At step S14, the microprocessor 1 judges whether the value of k is larger than the number of times N of the movement pulse fi at every sampling time. In the case when it is larger, the microprocessor 1 advances to step S15 and computes a value by substituting zero for the movement pulses fix, fiy, fiz, fiw at each axis. At step S16 the microprocessor 1 judges whether or not it is a final aiming position.

At step S16 when it is judged that it is a final aiming position (in the case of Yes), the driving of the robot is terminated, and when it is not a final aiming position (in the case of No), the microprocessor 1 returns to step S6 and repeats the operation.

On the other hand, at step S12, when the value of k is not identical to the number of times N of the movement pulse fi at every sampling time (k=N, in the case of No), the microprocessor 1 advances directly to step S16 and judges whether it is a final aiming position of the robot. At step S14 in the case when the value of k is not larger than the number of times N of the movement pulse fi at every sampling time (in the case of No), the microprocessor 1 also advances directly to step S16 and judges whether it is a final aiming position of the robot.

Thus, in accordance with the position controlling method for a robot of the present invention, since each axis is driven by the exponential functional acceleration and deceleration, and the aiming position at every sampling time is computed by the discrete time state equation, the preciseness of the position path is improved and high speed control without vibration is possible. Also each axis starts simultaneously, and the driving is simultaneously terminated. Therefore, the vibration generated by interfering movement along an axis can be substantially decreased.

While the present invention has been described with reference to a particular embodiment it should be apparent to one skilled in the art that many changes and modifications may be made without departing from the spirit and scope of the invention as defined in the claims.

I claim:

1. Position controlling method for a robot comprising:
   step for computing an initial positional deviation of each axis and a maximum positional deviation;
   step for computing a pulse number and a movement pulse number, said movement pulse number being dependant on said pulse number and said maximum positional deviation;
   step, for computing a movement pulse of each axis of the robot at every sampling time in the case of no acceleration and deceleration, said movement pulse depending on said pulse number, the positional deviation and the movement pulse number;
   step for calculating a position incremental amount for each axis, and for compensating for a remainder value obtained as a result of the position incremental amount calculated for each axis;
   step, for obtaining a robot driving aim position at a first incremental time point for each axis depending on said positional incremental amount, and for computing a positional deviation at the first incremental time point;
   step, for executing proportional, integral, and differential control of the positional deviation at the first incremental time point, for converting proportioned integrated and differentiated values to an analog value, for outputting the analog value to a motor;
   step, for obtaining an aim position of the robot at a second incremental time point during movement of the robot, and for judging whether a value of the second incremental time point is identical to the movement pulse number at every sampling time;
   step for obtaining remainder values of each axis by seeking the movement pulse number at every sampling time when it is identical;
   step, for judging whether the value of the second incremental time point is larger than the movement pulse number at every sampling time;
   step for computing a value by substituting zero for the movement pulse at each axis in the case when the value of the second incremental time point is larger than the movement pulse number; and
   step, for judging whether or not it is a final aiming position, for terminating robot driving when it is judged that it is a final aiming position.

2. Position controlling method for a robot according to claim 1, wherein said sampling time has a predetermined value in relation to a time interrupted by a timer so that a present position of the robot is computed every time an interrupt is applied within a certain time interval.

3. Position controlling method for a robot according to claim 1, wherein the pulse number moved at every sampling time in the case of no acceleration and deceleration is represented by the following equation $$fi = \frac{Vmax}{T} \times P \times Ts[\text{pulse}]$$

wherein Vmax is a highest velocity of the motor, T is a time, P is a pulse number of an encoder, Ts is the sampling time.

4. Position controlling method for a robot according to claim 1, wherein said proportional integral and differential control is determined such that the moving condition of the robot becomes optimum based upon the position deviation of each axis and it is converted into an analog signal by a digital/analog converter and thereafter is input to a servo control section for driving the servomotor.

5. Position controlling method for a robot according to claim 1, wherein the step for judging whether the value of K is identical to the number of times N of the movement pulse at every sampling time, when the value K is not identical to N, directly judges whether it is a final aiming position of the robot.

6. Position controlling method for a robot according to claim 1, wherein the step for judging whether the value of K is larger than the number of times N of the movement pulse at every sampling time, when the value K is smaller than k, directly judges whether it is a final aiming position of the robot.

7. Position controlling method for a robot according to claim 1, wherein the step for judging whether or not it is a final aiming position, when it is not a final aiming position, returns to the step for computing the position incremental amount of each axis.

* * * * *